United States Patent [19]

Kutner

[11] Patent Number: 5,642,498
[45] Date of Patent: Jun. 24, 1997

[54] SYSTEM FOR SIMULTANEOUS DISPLAY OF MULTIPLE VIDEO WINDOWS ON A DISPLAY DEVICE

[75] Inventor: Michael A. Kutner, Mountain View, Calif.

[73] Assignees: Sony Corporation, Tokyo, Japan; Sony Electronics, Inc., Park Ridge, N.J.

[21] Appl. No.: 226,738

[22] Filed: Apr. 12, 1994

[51] Int. Cl.$^6$ .................................................. G06F 15/00
[52] U.S. Cl. ......................... 395/509; 395/507; 395/340
[58] Field of Search ..................................... 395/155, 156, 395/157, 158, 159, 160, 161, 135, 164

[56] References Cited

U.S. PATENT DOCUMENTS

| | | | |
|---|---|---|---|
| 4,876,600 | 10/1989 | Pietzsch et al. | 348/588 |
| 4,947,257 | 8/1990 | Fernandez et al. | 348/585 |
| 4,953,159 | 8/1990 | Hayden et al. | 370/62 |
| 4,996,598 | 2/1991 | Hara | 348/589 |
| 5,195,086 | 3/1993 | Baumgartner et al. | 370/62 |
| 5,261,030 | 11/1993 | Brooke | 395/135 |
| 5,274,753 | 12/1993 | Roshowski et al. | 395/135 |
| 5,375,068 | 12/1994 | Palmer et al. | 364/514 C |
| 5,398,309 | 3/1995 | Atkins et al. | 395/135 |
| 5,404,316 | 4/1995 | Klingler et al. | 395/161 |
| 5,414,455 | 5/1995 | Hooper et al. | 348/7 |
| 5,414,808 | 5/1995 | Williams | 395/154 |
| 5,495,564 | 2/1996 | Takahashi | 395/135 |
| 5,499,327 | 3/1996 | Sator | 395/135 |

OTHER PUBLICATIONS

Watabe et al., "Distributed Desktop Conferencing System with Multi-user Multimedia Interface", May 1991, pp. 531-538.

*Primary Examiner*—Mark R. Powell
*Assistant Examiner*—Ba Huynh
*Attorney, Agent, or Firm*—Jerry A. Miller; Charles J. Kulas

[57] ABSTRACT

A system for simultaneous display of multiple video windows on a display device. This system includes a primary interface for receiving a primary video signal and a primary storage memory for storing data representing the primary video signal. Further, the present invention provides a plurality of secondary interface for receiving a plurality of secondary video signals and a secondary storage memory for storing data representing the plurality of secondary video signals. An output for selectively outputting the contents of a primary storage memory and the secondary storage memory to a display device so as to display video imagery represented by the primary video signal and secondary video signals in respective multiple video windows on the display device.

15 Claims, 7 Drawing Sheets

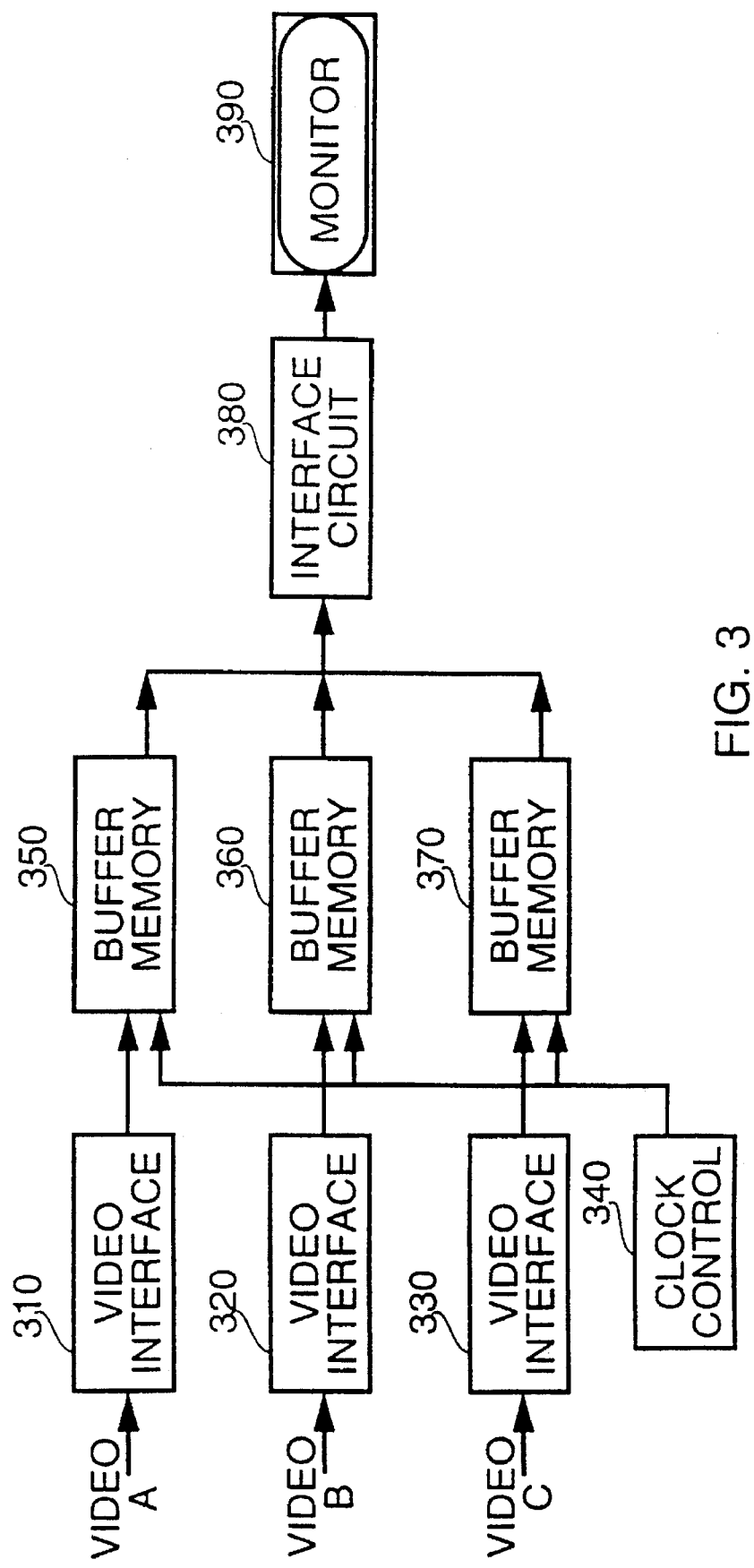

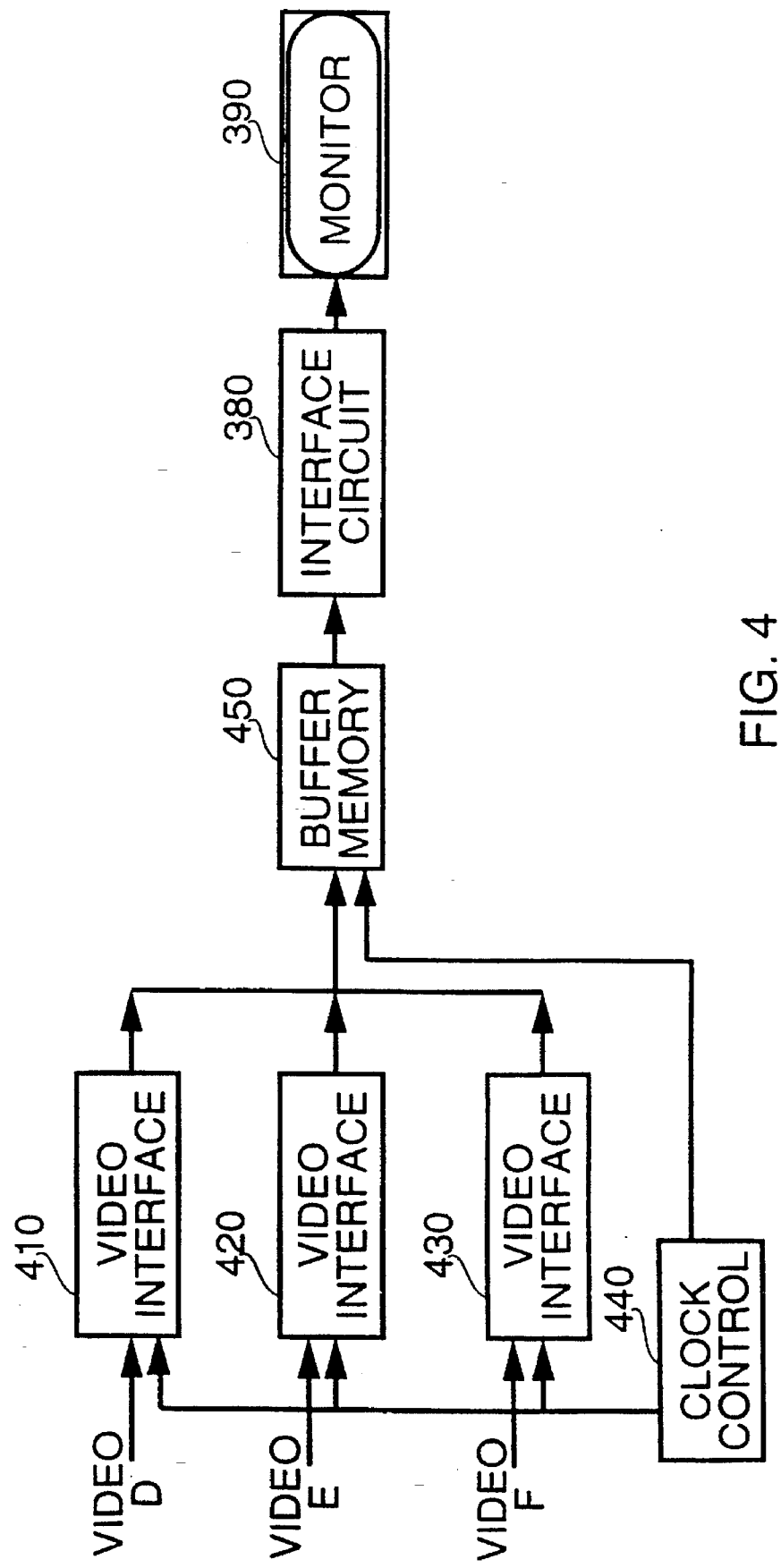

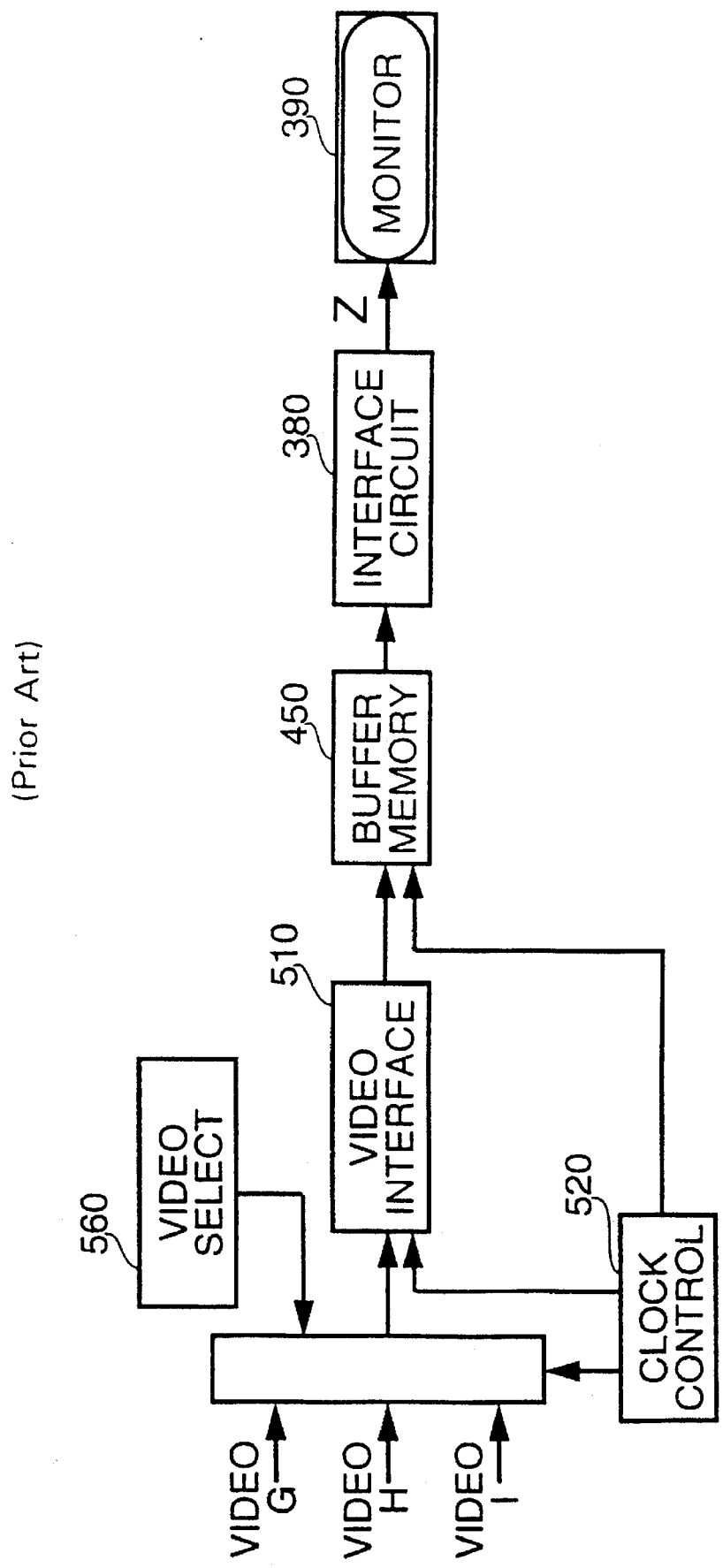

SYSTEM FOR SIMULTANEOUS DISPLAY OF MULTIPLE VIDEO WINDOWS ON A DISPLAY DEVICE

FIELD OF THE INVENTION

The present invention relates to a method and apparatus for displaying a plurality of full motion, or live, video images on a single display device such as, for example, a CRT, LCD or plasma type display.

BACKGROUND

Display devices such as CRT's or LCD's are widely used to display full motion, or live, video images. Display devices are often used to display only a single video image at any one time. However, there are also ways of allowing more than one, or multiple, full motion video images to be simultaneously displayed on a signal display device. Such multiple video images are typically displayed in separate "windows" on the display device. FIG. 1 illustrates a display device 900 on which a single video window 910 is displayed. FIG. 2 illustrates a display device 900 on which multiple video windows 920 are displayed.

The currently known techniques for accomplishing the simultaneous display of multiple video images on a single display device do, however, have certain disadvantages associated with it. In short, these disadvantages include high cost, and the need for complex circuitry.

One common technique of accomplishing the simultaneous display of multiple live video images on a signal display device is illustrated in FIG. 3. With this technique, video signals A, B and C, which represent separate video images, are input to and processed individually via separate video interface circuitry 310, 320, and 330. The video interface circuitry 310, 320, and 330 digitizes and extracts timing information for each video signal A, B and C, respectively. The video interface circuit may also be used to perform other processing operations, such as adjusting the size of the digitized video image. The resulting digital data for each video image is then output to a respective separate video buffer memory 350, 360 or 370 where it is temporarily stored before being output to a main interface circuit 380. The main interface circuit 380 converts the digital data output by the buffer memories into an analog signal and adds appropriate timing information. Further, the outputs of all of the buffer memories 350, 360 and 370 are combined by, and output to monitor 390 through, the main interface circuit 380. The addressing and output of all buffer memories 350, 360 and 370 is controlled by a clock/control circuit 340. The contents of the buffer memories 350, 360 and 370 are simultaneously read out at a rate which is substantially equal to the rate at which pixel information is being displayed on display monitor 390. The output of each buffer memory 350, 360 and 370 is controlled so that information stored in each address location in the buffer memory is output at an appropriate time to produce a visual image on monitor 390 which corresponds to data stored in each buffer memory 350, 360 and 370 as combined by interface circuit 380. One disadvantage of this technique of displaying multiple video images is that it requires complex and expensive memory and control circuitry and does not perform well as the number of live video image signals which are input increases.

Another common technique is shown in FIG. 4. Here multiple video signals D,E and F, which represent separate full motion images are input to and processed by separate video interface circuits 410, 420 or 430 respectively. All of the resulting processed video data output from each interface circuit are then combined, or multiplexed, and temporarily stored in a single buffer memory 450. Clock control circuit 440 controls the output of each video interface circuit 410, 420 and 430 to buffer memory 450, and also generates memory addressing information for the video data output from each of the video interface circuits and stored in buffer memory 450. This video data is then output or read out of buffer memory into interface circuit 380 wherein is processed and output as a signal Z appropriate for driving monitor 390 to display imagery and information represented by signal Z. While this technique requires less buffer memory than the technique shown in FIG. 3, it has several disadvantages. First, each of the video interfaces 410, 420 and 430 generate a constant stream of data which must be written into the buffer memory. This requires a very high data bandwidth which means that expensive high performance buffer memories must be used. Secondly, as the number of video signals which are desired to be input increases, the performance requirements, such as speed or bandwidth of the buffer memory increases. In addition, where overlapping live video windows are desired, additional complicated circuitry for addressing and control functions must be used. Further, in situations where cost constraints require the use of a single, low-performance buffer memory, the data bandwidth of the live video signal or stream must be reduced by either reducing the resolution of the displayed video images or decreasing the size of the video image to be displayed.

Another apparatus for accomplishing the display of multiple live video images is illustrated in FIG. 5. Here, all of the input video signals G, H and I are multiplexed via video select multiplexer 560 and output to one video interface 5 10. Assuming that all of the input video signals G, H and I are synchronous, the clock/control circuitry 520 will select a new or different input video signal G, H or I during the video blanking interval between successive frames. In this manner, the maximum total data rate can be maintained constant regardless of the number of input video signals. However, as the number of input video signals increases, the display update rate (the rate at which new display information is provided to the display device) of the video signals will be decreased due to the additional time which will be required to access/select the additional input video signals for input to video interface 510.

SUMMARY OF THE INVENTION

The present invention seeks to address the above identified shortcomings by providing for a system for simultaneous display of multiple video windows which requires only two buffer memories, each of which is at least large enough in storage capacity to store information corresponding to each pixel of a display device such as a video monitor. One of these buffer memories, a primary buffer memory, is dedicated to storing data corresponding to a primary video signal which is to be displayed in a main video window on the video monitor. The other buffer memory, or secondary buffer memory, is dedicated to storing video data corresponding to a plurality of secondary video signals, each of which are to be displayed on the video monitor in secondary windows, each of which is smaller in area than the main window. In the present invention, as additional secondary video signals are input, there is no need for additional buffer memories to store these additional video signals, since each video signal is selectively chosen by an input control device, for input into the secondary buffer memory. In this way, multiple video windows can be accommodated without the need for adding additional memory or control circuitry for each secondary video signal which is added for input.

The present system includes a primary interface for receiving a primary video signal. The primary interface includes a primary storage memory for storing data representing the input primary video signal. The present system further includes a secondary interface for receiving a plurality of secondary video signals. The secondary interface includes a secondary storage memory for storing data representing a plurality of secondary video signals which are input. There is also included an output controller for selectively outputting the contents of the primary storage memory and secondary storage memory to a display device. The method of the present invention for simultaneously displaying multiple video windows on a display device includes the steps of inputting a primary analog composite video signal including a plurality of secondary analog composite video signals; converting the primary analog composite video signal into a primary digital video signal; converting the plurality of secondary analog composite video signals into a plurality of secondary digital video signals; storing the primary digital video signal data into a primary storage memory means; inputting the plurality of secondary digital video signal data into a secondary storage memory; selectively reading out of the primary storage memory and the secondary storage memory, respectively, the secondary digital video data and the primary digital video data and outputting the secondary digital video data and the primary digital video data to a display device so as to display a primary full-motion video image within a primary window on the display device simultaneously with the display of a plurality of secondary full-motion video images which are displayed respectively within a plurality of secondary video windows on the display device.

BRIEF DESCRIPTION OF THE DRAWINGS

FIG. 3 is a block diagram illustrating one technique for displaying multiple live video images;

FIG. 4 is a block diagram illustrating another technique for displaying multiple live video images;

FIG. 5 is a block diagram illustrating a third technique for displaying multiple live video images;

DESCRIPTION OF THE PREFERRED EMBODIMENT

Figure 6:
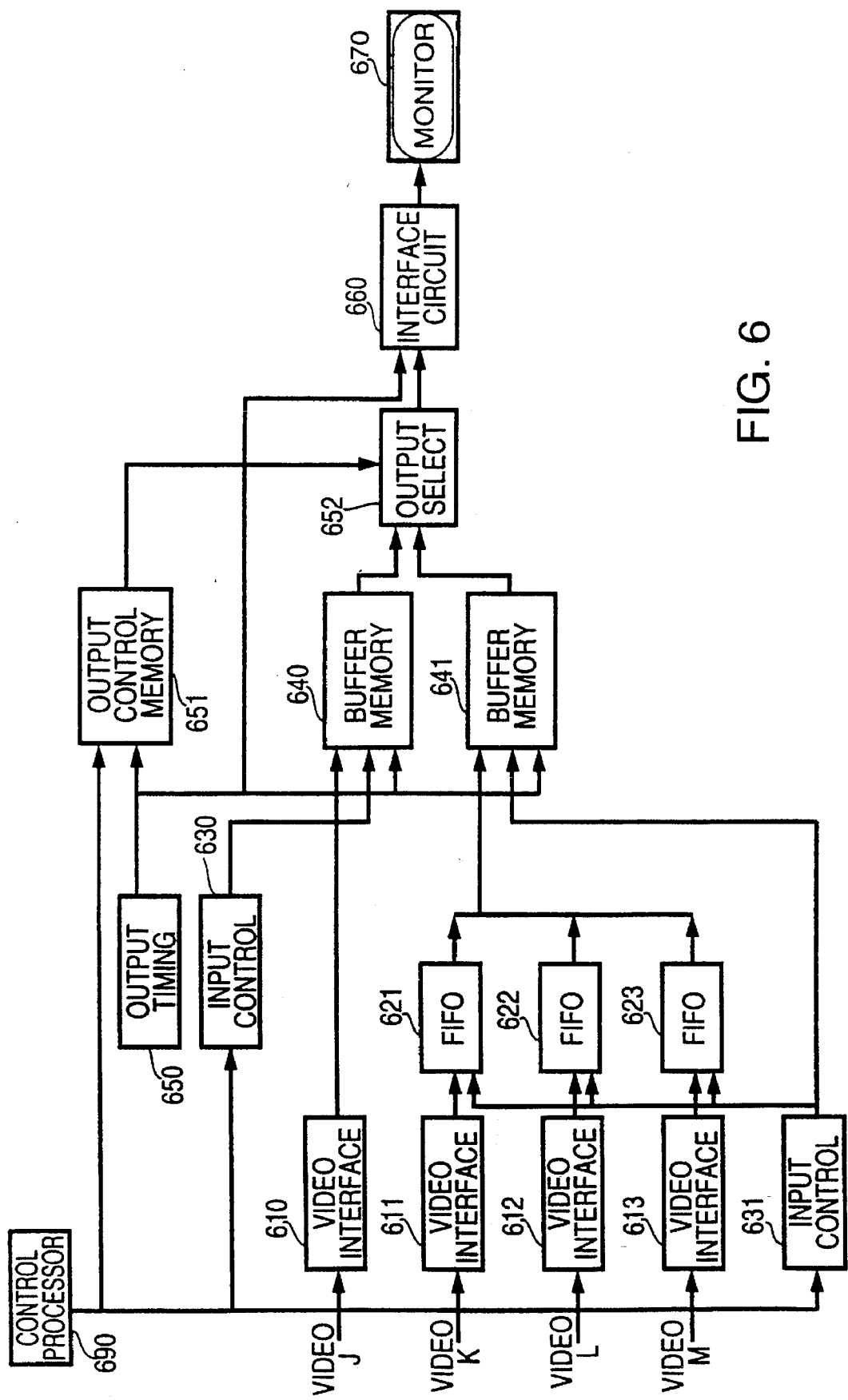
FIG. 6 is a block diagram illustrating one embodiment of the present invention.

One embodiment of the present invention is shown in FIG. 6. In short, a primary video interface (video interface 610) and primary buffer memory (buffer memory 640) are dedicated to receiving and storing the input of a primary video signal (video signal J) representing a primary video image which it is desired to have displayed in the largest of a plurality of windows displayed on a single display device, monitor 670. A plurality of secondary video interfaces (video interfaces 610, 611, 612 and 613) and a buffer memory (buffer memory 641) are dedicated to receiving and storing the input of a plurality of video signals which it is desired to have displayed in a plurality of smaller windows displayed on the same display device (monitor 670), simultaneous with the display of a primary, or larger video image, represented by video data received by video interface 610 and stored in primary buffer memory 640.

In this embodiment, video signals are applied to each of the video interface circuits 610, 611, 612, and 613. It will be appreciated that these video signals may be either composite or component analog video signals. Further, it will be appreciated that the input video signals could be digital signals. For purposes of explanation of the present invention it will be assumed that the live video signals are composite analog video signals. Each of video interface circuits 610, 611, 612 and 613 converts the composite analog video signal to a digital video signal and extracts relevant timing information from the composite analog video signal. It will be noted that video interface circuits 610, 611, 612 and 613 may be utilized to process the digital video signal by adding or dropping video pixels to increase or decrease the size of the digitized video image or images. Further, these video interface circuits may also be utilized to process the digital video signal so as to change the color hue or intensity of the video images represented by the video signal.

The video signal J applied to the input of video interface 610 corresponds to an image which it is desired to have appear in the largest of the multiple windows which will be displayed on the single display monitor 670. This video signal may be referred to as the primary video signal and is input, processed and stored via a video interface 610 and buffer memory 640, which can be referred to as a primary video interface circuit 610 and primary buffer memory 640. The output of video interface 610 is applied to the input of buffer memory 640. Buffer memory 640 may be, for example, a dual ported memory. Using timing information extracted from the input video signal by video interface 610, input control circuit 630 generates address information and controls the writing of processed digitized video data from video interface 610 into buffer memory 640. The address information generated by input control circuit 630 controls the address location, or write position, of the processed video data in buffer memory 640 into which the digitized video data will be stored. Depending upon the address location at which the video data is written, the position of the live video image on the display monitor can be controlled since each address location corresponds to a particular pixel, or pixels, on the monitor 670. Information necessary for the calculation of the write position is in input to control circuit 630 by control processor 690. This information is variable and may include such things as information relating to the position of the live video image on the display monitor and/or the display mode such as, for example, field mode, freeze-frame mode, or freezefield mode.

It should be noted that the bandwidth of the digital video signal or stream between video interface 610 and buffer memory 640 is contingent upon the type of processing performed by video interface 610. For example, if the video interface performs processing which drops pixel information to reduce the size of the displayed video image, then the bandwidth of the digital video stream will be decreased. Likewise, if the video interface processing adds pixel information to increase the size of the displayed video image, the bandwidth of the digital video stream will be increased. It will be noted that the input bandwidth of buffer memory 640 is preferably sufficiently large that it can accommodate the data rate required to display any size live video window on the display monitor.

The outputs of video interface circuits 611, 612, and 613 are applied to the inputs of FIFO memories 621, 622, and 623 respectively, under the control of input control circuit 631, where this video data is temporarily stored until it is output to buffer memory 641. Buffer memory 641 may be, for example, a dual ported memory. Input control circuit 631 directs the processed digitized video data stream and timing information from video interface 611 to be written into FIFO memory 621. Likewise, the processed digitized video data stream and timing information output from video interface 612 is written into FIFO memory 622, and the processed digitized video data stream and timing information from video interface 613 is written into FIFO memory 623. This timing information may include information denoting line and frame.

Input control circuit 631 also controls the reading of data from FIFO memories 621, 622, 623 into buffer memory 641, including the generation of address, or write position information. The address information generated by input control circuit 631 determines the write position, or memory location, to which the processed video data output from the video interface circuits 611, 612 and 613 will be written into buffer memory 641. By controlling the memory location to which the processed video data is written, the displayed position of the video images, represented by the video data stored in buffer memory 641, on the video monitor 670 can be controlled. Calculation information necessary for the calculation of the video data write address or write position in buffer memory 641 is set in input control circuit 631 by control processor 690. This variable calculation information may include information which determines the position of each live video image on the display monitor or the display mode (i.e., field mode, freeze-frame mode, or freeze-field mode). One set of calculation information is used for each input video and timing data.

When video or timing data are available for output from FIFO memory 621, input control circuit 631 uses the extracted timing data, along with the position and mode settings for this data stream, to calculate a video data write address of buffer memory 641. Input control circuit 631 then writes the video data from FIFO memory 621 into the calculated address in Buffer Memory 641. Input control circuit 631 continues this process until all of the data in FIFO memory 621 has been written into Buffer Memory 641, or until a predetermined number of video data samples have been written into memory. Then, input control circuit 631 performs the same action using data and timing information from FIFO memory 622 and 623. This process of reading from FIFO memories 621, 622, and 623 is repeated as long as necessary to display all desired video information.

It should be noted that the function of input control circuit 631 can be separated into four distinct actions: (1) writing data and timing information into the FIFO memories 621, 622 and 623, (2) calculating write address information based upon data and timing information read from the FIFO memories 621, 622 and 623, (3) successively selecting the three data streams output from FIFO memories 621, 622 and 623 for input into buffer memory 641, and (4) controlling the storing of video data into the buffer memory 641. It should be noted that it is not necessary that all four functions be performed by a single controller. Each video and timing data stream could have a separate dedicated controller associated therewith for writing data and timing information into the FIFO memory. Further, a separate dedicated controller could be used to calculate a write address in buffer memory 641, based upon data and timing information read from the FIFO memory.

As previously noted, the type of processing performed by video interfaces 611, 612, and 613 determines the bandwidth of the digital video stream between FIFO memories 621, 622, and 623 and buffer memory 641. If the video interface processing drops many pixels to reduce the size of the displayed video image, then the bandwidth of the digital video stream decreases greatly. In the preferred embodiment, the input bandwidth of buffer memory 641 is sufficiently large that it can accommodate the data rate requirements of one live video window of any size.

However, three video windows, for example, can be stored in buffer memory 641. Therefore, video interfaces 611, 612, and 613 must reduce the size of the video image to be displayed as a video window such that the total bandwidth does not exceed the bandwidth capacity of buffer memory 641. Output timing circuit 650 generates an address which is used to read video data from buffer memories 640 and 641. Buffer memories 640 and 641 are large enough in storage capacity so that they may each store video data corresponding to each pixel of the display monitor 670. For instance, if display monitor 670 provides a resolution of 1280 by 1024, both buffer memory 640 and 641 will be large enough to store video information for each pixel on display monitor 670. Buffer memory 640 is dedicated to storage of only information related to primary video imagery which is intended for display in a main window on display monitor 670. Buffer memory 641, on the other hand, is dedicated to storage of information related to a plurality of video images each of which is intended for display in one of the plurality of secondary windows on display monitor 670 which are either equal or smaller in size than the main window in which primary video imagery is displayed. Video data is read from the buffer memories 640 and 641 at a speed appropriate for proper display on monitor 670.

It should be noted that the output timing generated by output timing circuit 650 can be variable so that display monitors with different timing characteristics can be accommodated. The outputs of buffer memories 640 and 641 are multiplexed together by output select circuit 652. This circuit selects between the one live video window represented by information stored in buffer memory 640, and the multiple live video windows represented by information stored in buffer memory 641, in accordance with a signal output from output control memory 651. Control processor 690 stores data in output control memory 651 which determines for each pixel on the display monitor 670 whether to output the contents of buffer memory 640 or buffer memory 641. For example, with regard to a particular pixel, an output signal from output control memory 651 of '00' could be used to indicate that the contents of buffer memory 640 should be output, while an output signal of '01' could be used to indicate that the contents of buffer memory 641 should be output. In this way, by "toggling" between the output of buffer memory 640 and 641 for each pixel, the multiple live video windows can be displayed so that they appear to be "layered" on top of each other as desired.

The contents of output control memory 651 are read out under the control of output timing circuit 650. Output control memory 651 controls output select circuit 652. Interface circuit 660 converts the video data output from output select circuit 652 back into an analog video signal and adds appropriate video timing signals in accordance with output timing circuit 650 so that the video signal can be properly displayed on monitor 670. The resulting video signal or multiple video windows are then displayed on monitor 670.

Figure 1:
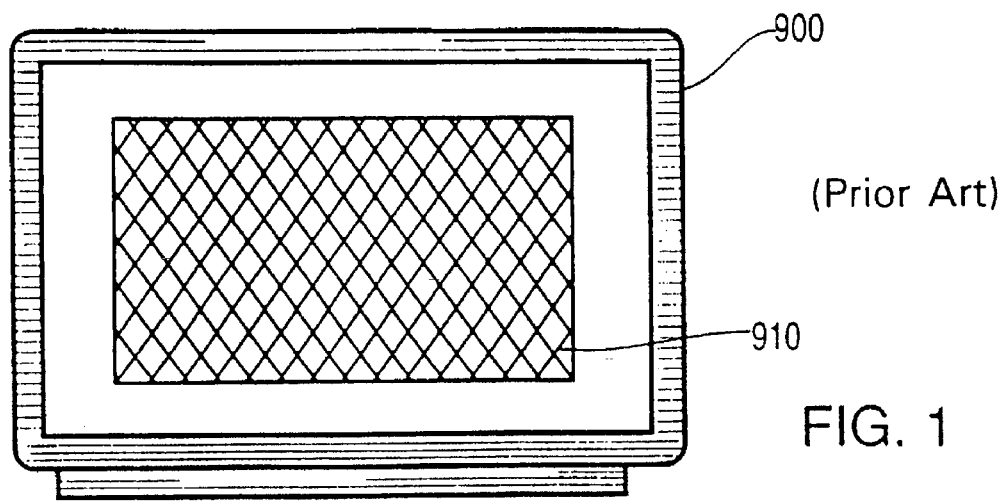
FIG. 1 is an example of a display monitor displaying a single video window.
Figure 2:
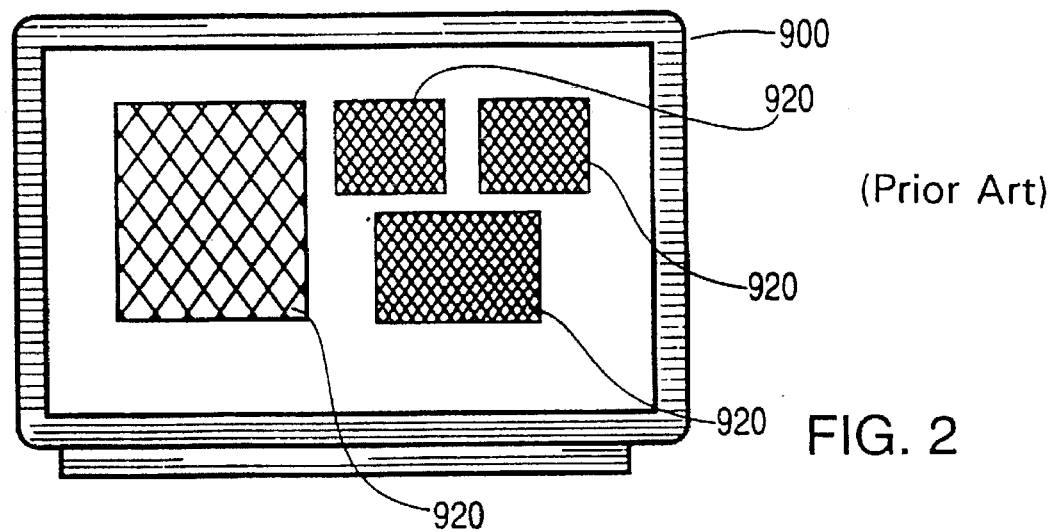
FIG. 2 is an example of a display monitor displaying multiple video windows.
Figure 9:
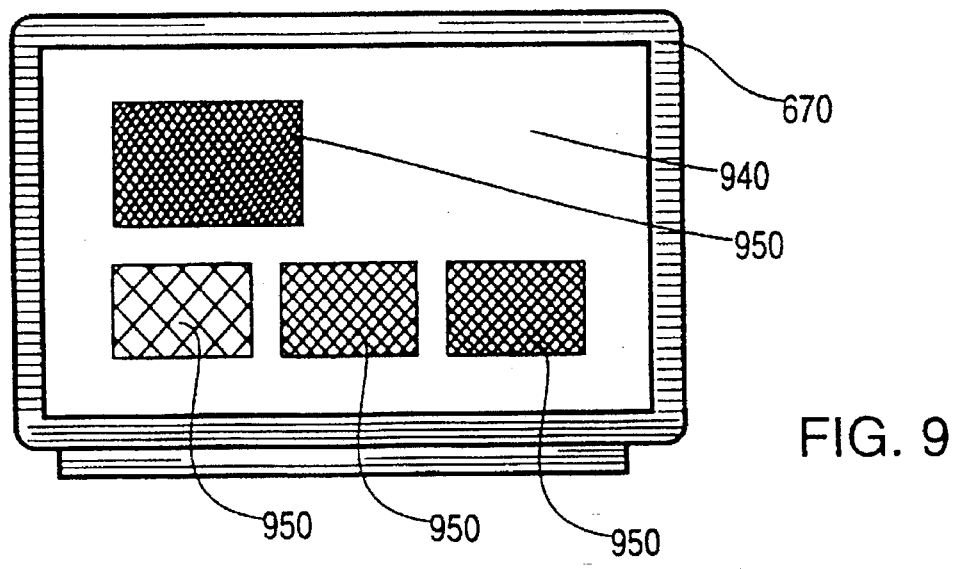
FIG. 9 is an illustration showing multiple video windows being displayed on a single display monitor along with graphic data.
Figure 7:
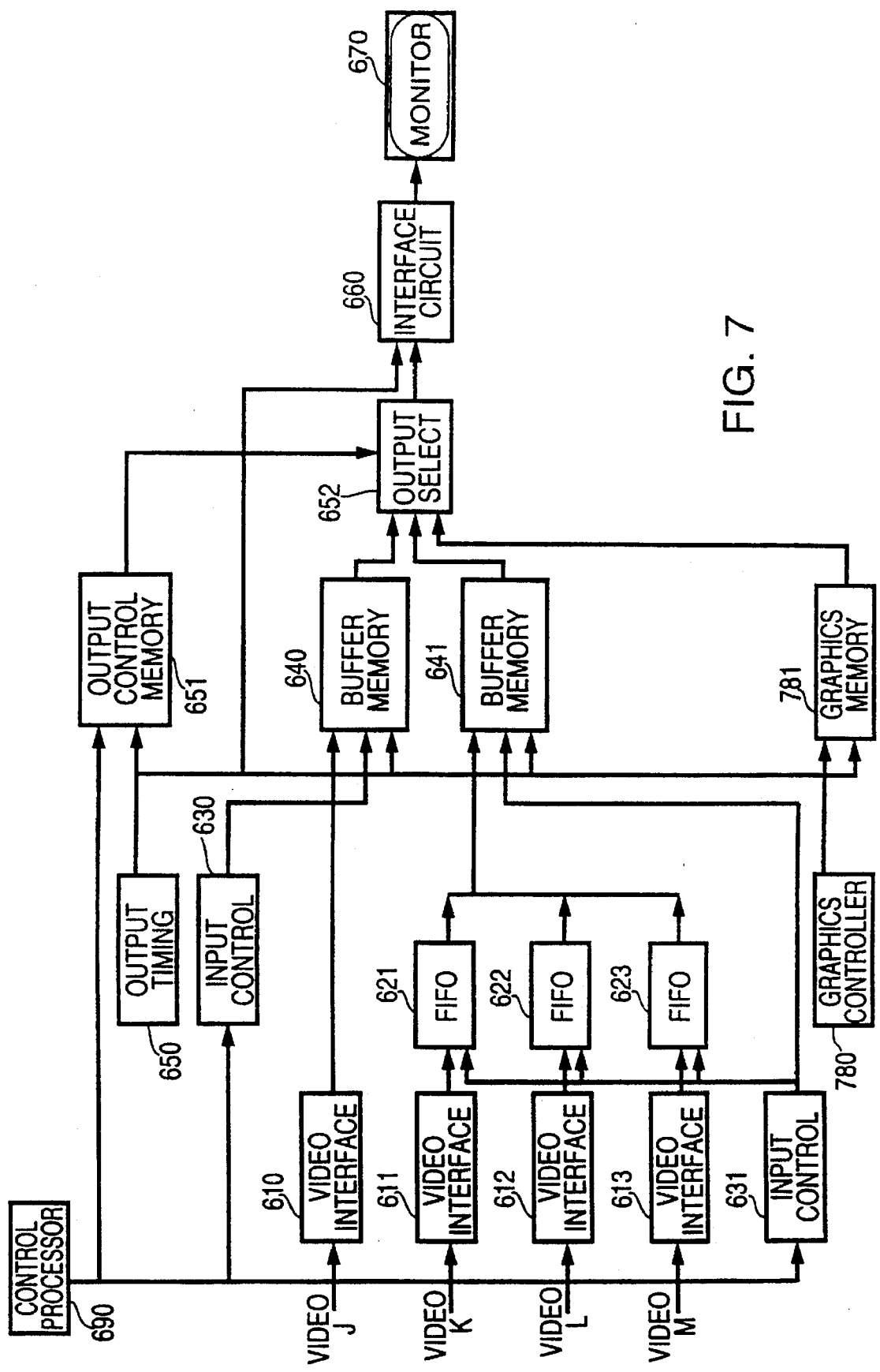
FIG. 7 is a block diagram showing a second embodiment of the present invention.

In a variation on the above described embodiment of the present invention, live video windows can be displayed on a single display device along with graphical images. In this embodiment of the present invention, graphical data 940 can be displayed along with video image data 950 in a "layered" fashion as illustrated in FIG. 9. With reference to FIG. 7, it can be seen that this embodiment is very similar to that described above and shown in FIG. 6. The differences are explained as follows.

Graphics controller 780 writes graphical images into graphics memory 781. Graphics controller 780 can be arranged to be controlled by control processor 690 or another separate control source, if desired. Output timing circuit 650 generates address information which is used to address memory locations in buffer memories 640 and 641, and graphics memory 781 from which video data are read. Video data are read from the buffer memories 640 and 641 at a speed appropriate for display on monitor 670. The timing information generated and output by output timing circuit 650 maybe adjustable so that display monitors with different timing characteristics can be accommodated. The outputs of buffer memories 640 and 641 and graphics memory 781 are multiplexed, or combined, by output select circuit 652. This output select circuit 652 selects between the single live video window represented by information stored in buffer memory 640, and the multiple live video windows represented by information stored in buffer memory 641, and the graphical image data stored in graphics memory 781. Control processor 690 stores data in output control memory 651 which are related to each pixel of display monitor 670 and which determines, or indicates, whether the contents of buffer memory 640, buffer memory 641, or graphics memory 781 will be output for display at a particular pixel on monitor 670.

As an example, an output signal from output control memory 651 of '00' could be used to indicate that the contents of buffer memory 640 should be output and an output signal from output control memory 651 of '01' could be output to indicate that the contents of buffer memory 641 should be output, while an output signal from output control memory 651 of '10' could be output to indicate that the contents of graphics memory 781 should be output. In this way, live video windows could be displayed so that they appear to be "layered" on top of each other or in any combination with the graphical image. It will be noted that the contents of output control memory 651 are read out under the control of output timing circuit 650. Further, the output of output control memory 651 controls output select circuit 652.

Figure 8:
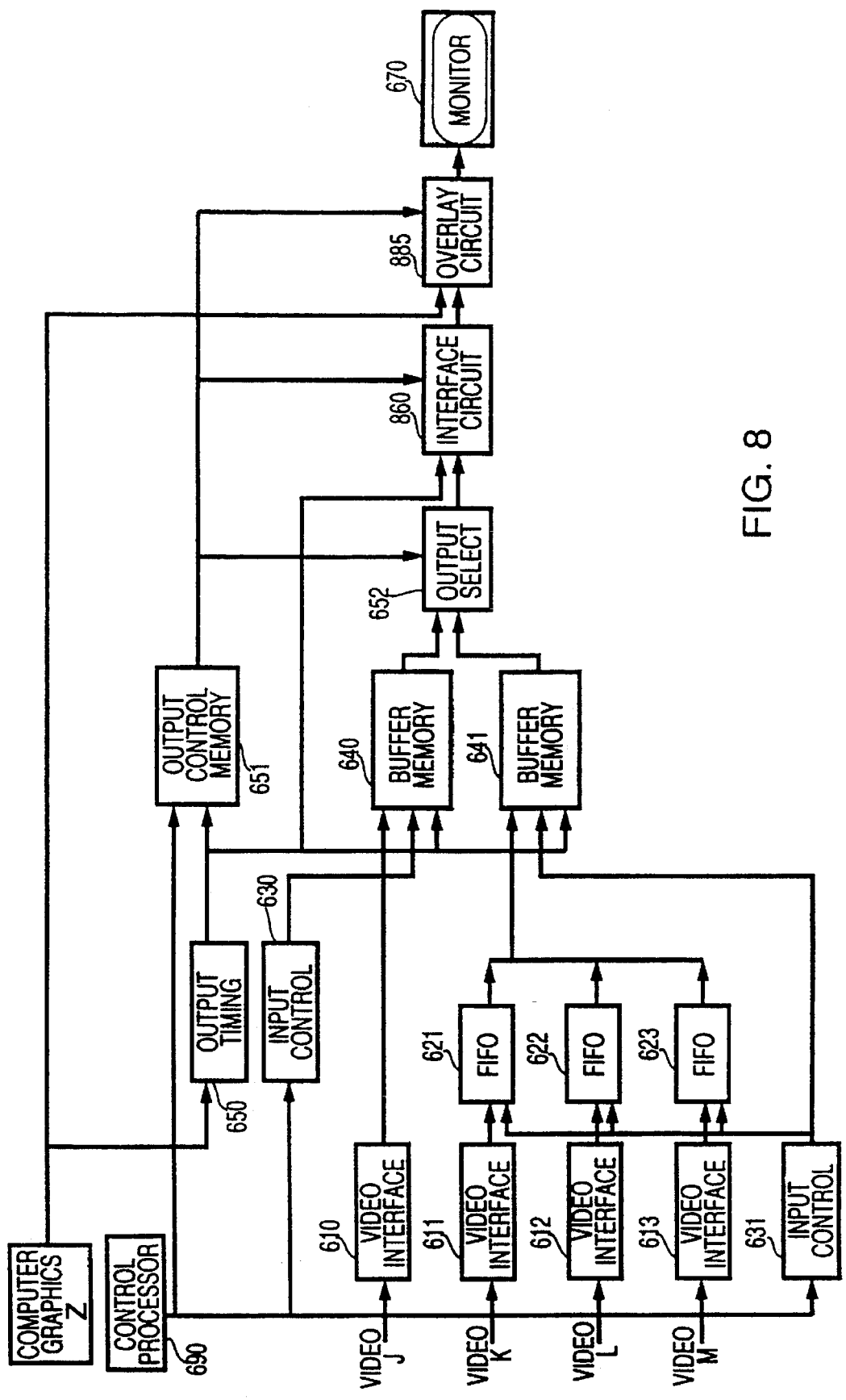
FIG. 8 is a block diagram showing another embodiment of the present invention.

FIG. 8 is an illustration of another embodiment of the present invention. This embodiment is distinguished over the previously described embodiment by the fact that output timing circuit 650 extracts timing information derived from an analog computer video display signal which is input to output timing circuit 650. Therefore, the output of buffer memories 640 and 641 is synchronized with the incoming computer video display signal. Similar to the invention shown in FIG. 7, control processor 690 stores data in output control memory 651.

Overlay circuit 885 is utilized to switch between the output of computer graphics data or video data from buffer memories 640 and 641. Overlay circuit 885 could be, for instance, an analog switch or an analog summation circuit. In the case where overlay circuit 885 is composed of an analog switch, the contents of output control memory 651 could be utilized to control both output select circuit 652 and overlay circuit 885. For example, an output signal from output control memory 651 of '00' could be used to direct output select circuit 652 to allow the contents of buffer memory 640 to be output to interface circuit 660. An '01' could be used to direct output select circuit 652 to allow the contents of buffer memory 641 to be output, and a '10' could be used to direct output select circuit 852 to allow the incoming computer video signal to be output to monitor 670. Where either a '00' or an '01' are output from output control memory 651, overlay circuit 885 acts to select the output of output select circuit 652 via interface circuit 660 for output to monitor 870. Where a '10' is output from output control memory 651, overlay circuit 885 selects the incoming computer video signal for output to monitor 670.

In the case where overlay circuit 885 is an analog summation circuit, the contents of output control memory 651 controls both output select circuit 652 and a blanking circuit in interface circuit 660. For example, a signal output from output control memory 651 of '00' could mean to output the contents of buffer memory 640, a signal output of '01' could mean to output the contents of buffer memory 641, and a signal output of '10' could mean to output the incoming computer video signal. For the cases where output control memory 651 outputs a signal of '00' or '01', overlay circuit 885 adds the output of output select circuit 652 to the input computer graphics image. This assumes, however, that the computer graphics image is black, or non-existent, where live video images are to be displayed. For the case where output control memory 651 outputs a signal of '10', the blanking circuit in interface circuit 860 is enabled so that a black signal is added to the incoming computer video signal. This effectively selects the incoming computer video signal for output to display monitor 670.

In each of the above embodiments shown in FIGS. 6–8, a primary buffer memory is dedicated to storing data corresponding to a primary video signal. This data is displayed in a main video window on the video monitor. A secondary buffer memory is used to store video data corresponding to a plurality of secondary video signals which are displayed on the video monitor in secondary windows. Each of the secondary windows is smaller in area than the main video window. In the present invention, as additional secondary video signals are input, they are stored in the secondary video memory. There is no need to provide additional memory, regardless of how many video input signals are provided. Therefore, the present invention provides a simple mechanism for display of multiple video windows using only a pair of comparatively low speed video memories.

Those skilled in the art will appreciate that many variations are possible without departing from the present invention. For example, any number of secondary input signals can be received by the secondary interface. While dual port memories are preferred, other types of memory may be suitable. The FIFO memory can be implemented using shift registers or other suitable storage elements. The input signal can be in the form of composite or component analog video or any suitable digital video format. Further, it will be appreciated that numerous other alternative embodiments may be devised without departing from the spirit and scope of the following claims.

What is claimed is:

1. A device for simultaneous display of multiple secondary video windows overlapping with a primary video window, comprising:

primary interface means for receiving a primary video signal for display in a primary window and for outputting primary pixel values representing said primary window;

a primary storage memory for receiving and storing said primary pixel values representing said primary video window;

secondary interface means for receiving a plurality of secondary video signals for display in a plurality of secondary windows and for outputting secondary pixel values representing said secondary video windows;

a secondary storage memory for receiving and storing said secondary pixel values representing said secondary video windows, wherein, for a predetermined number of pixels, said secondary storage memory stores secondary pixel values corresponding to the pixel values in said primary storage memory;

selection means coupled to the secondary interface means and to the secondary storage means for selecting one of the plurality of secondary video signals and sending the corresponding secondary pixel values to the secondary storage memory;

output timing means coupled to said primary and secondary storage memories for causing the simultaneous output of a given primary pixel value from said first primary storage memory to be displayed at a first screen location with a corresponding secondary pixel value from said secondary storage memory to be displayed at the same first screen location; and output selecting means coupled to said primary and secondary storage memories for assembling said primary and secondary video windows by selecting and displaying one of said simultaneously output pixel values.

2. The device for simultaneous display of multiple video windows of claim 1, further comprising a video display for receiving and displaying said windows assembled by said output selecting means.

3. The device of claim 1, wherein the multiple video windows are displayed on a display screen having a predetermined number of pixels, wherein the primary and secondary storage memories are the same size and each have a capacity at least equal to the predetermined pixel resolution.

4. The device of claim 1, wherein the primary and secondary interface means receive video data streams in real time.

5. A device for simultaneous display of multiple secondary video windows overlapping with a primary video window, the device comprising:

a primary input means comprising an input for receiving a primary video signal and a primary storage memory for storing primary pixel data representing said input primary video signal;

a secondary input means comprising a plurality of inputs for receiving a plurality of secondary video signals and a secondary storage memory for storing secondary pixel data representing said plurality of secondary input video signals, wherein, for a predetermined number of pixels, said secondary storage memory stores a corresponding secondary pixel value for a primary pixel value in said primary storage memory;

selection means coupled to the secondary interface means and to the secondary storage means for selecting one of the plurality of secondary video signals and sending the corresponding secondary pixel values to the secondary storage memory;

output timing means coupled to said primary and secondary storage memories for causing the simultaneous output of a given primary pixel value from said first primary storage memory to be displayed at a first screen location with a corresponding secondary pixel value from said secondary storage memory to be displayed at the same first screen location;

an output means coupled to said primary and secondary storage memories for displaying primary and secondary video windows by selecting and displaying one of said simultaneously output pixel values;

said input primary video signal represents a video signal which is to be displayed in a primary window on a display device;

said plurality of input secondary video signals represent video signals which are to be displayed in respective secondary windows on a display device;

said secondary windows are smaller in area than said primary window.

6. A device for simultaneous display of multiple video windows according to claim 5 wherein said primary and secondary video signals are analog composite video signals.

7. A device for simultaneous display of multiple video windows according to claim 6 wherein said primary input means further comprises means for converting said primary analog composite video signal into representative primary digital video data which is then stored in said primary storage memory.

8. A device for simultaneous display of multiple video windows according to claim 7 wherein said output means further comprises means for converting said primary digital video data into an analog video signal for display on said display device.

9. A device for simultaneous display of multiple video windows according to claim 6 wherein said secondary input means further comprises means for converting said secondary analog composite video signal into secondary digital video data which are then stored in said secondary memory.

10. A device for simultaneous display of multiple video windows according to claim 9 wherein said output means further comprises means for converting said secondary digital video data into an appropriate analog video signal for display on said display device.

11. A device for simultaneous display of multiple video windows according to claim 5 further comprising:

a graphics processor for generating a graphics signal;

a graphics storage memory for storing data representing said graphics signal;

said output means further comprising means for selectively outputting the contents of said graphics storage memory to said display device.

12. A device for simultaneous display of multiple video windows according to claim 11 wherein said graphics signal represents textual information.

13. A method for simultaneously displaying multiple secondary video windows overlapping with a primary video window on a display device, the method comprising the steps of:

inputting a primary analog composite video signal;

inputting a plurality of secondary analog composite video signals;

converting said primary analog composite video signal into a primary digital video signal;

converting said plurality of secondary analog composite video signals into a plurality of secondary digital video signals;

selecting one of said plurality of secondary digital video signals;

storing said primary digital video signal data into a primary storage memory means in the form of primary pixel data;

inputting said selected secondary digital video signal into a secondary storage memory means wherein, for a predetermined number of pixels, said secondary storage memory stores a corresponding secondary pixel value for each primary pixel value in said primary storage memory;

output timing means coupled to said primary and secondary storage memories for causing the simultaneous output of a given primary pixel value from said first primary storage memory to be displayed at a first screen location with a corresponding secondary pixel value from said secondary storage memory to be displayed at the same first screen location; and output means coupled to said primary and secondary storage memories for displaying primary and secondary video windows by selecting and displaying one of said simultaneously output pixel values.

14. A device for simultaneous display of multiple secondary video windows overlapping with a primary video window, the device comprising:

a primary video interface for receiving a primary video signal and for outputting primary video data;

a plurality of secondary video interfaces each for receiving one of a plurality of secondary video signal inputs and for outputting secondary video data;

a primary buffer memory connected to an output of said primary video interface for storing primary video data output from said primary video interface in the form of primary pixel data;

selection means coupled to the plurality of secondary video interfaces, for selecting and outputting one of the plurality of secondary video signal inputs as secondary video data;

a secondary buffer memory coupled to the selection means, for storing the secondary video data output from the selection means, wherein, for a predetermined number of pixels, said secondary storage memory stores a corresponding secondary pixel value for each primary pixel value in said primary storage memory;

output timing means coupled to said primary and secondary storage memories for causing the simultaneous output of a given primary pixel value from said first primary storage memory to be displayed at a first screen location with a corresponding secondary pixel value from said secondary storage memory to be displayed at the same first screen location;

input control for selectively controlling the input of said secondary video data from said plurality of secondary video interfaces into said secondary buffer memory; and output means coupled to said primary and secondary storage memories for displaying primary and secondary video windows by selecting and displaying one of said simultaneously output pixel values.

15. A device for simultaneous display of multiple video windows comprising:

a primary video interface for receiving inputs of a primary video signal;

said primary video interface comprises an input and an output;

a plurality of secondary video interfaces for receiving input of a plurality of secondary video signals;

each of said plurality of secondary video interfaces comprises an input and an output;

primary buffer memory connected to the output of said primary video interface for storing primary video data corresponding to said input primary video signal;

a plurality of temporary first-in first-out ("FIFO") storage memories connected to the output of each of said secondary video interfaces respectively, for receiving secondary video data corresponding to said input secondary video signals;

said temporary FIFO storage memories comprise an input and an output;

an input control for selecting one of the FIFO storage memories and enabling the output of the selected FIFO storage memory;

secondary buffer memory coupled to the output of the FIFO storage memories for receiving the output of the selected FIFO storage memory;

an output select circuit coupled to the primary and secondary buffer memories for selecting between primary and secondary video data; and display means coupled to the output select circuit for displaying the selected primary and secondary video data as multiple video windows.

* * * * *